United States Patent
Montalvo et al.

(10) Patent No.: US 10,111,280 B2
(45) Date of Patent: Oct. 23, 2018

(54) MULTI-CARRIER BASE STATION RECEIVER

(71) Applicant: Analog Devices, Inc., Norwood, MA (US)

(72) Inventors: Antonio Montalvo, Raleigh, NC (US); Kevin G. Gard, Raleigh, NC (US)

(73) Assignee: ANALOG DEVICES, INC., Norwood, MA (US)

( * ) Notice: Subject to any disclaimer, the term of this patent is extended or adjusted under 35 U.S.C. 154(b) by 303 days.

(21) Appl. No.: 14/965,693

(22) Filed: Dec. 10, 2015

(65) Prior Publication Data

US 2016/0100455 A1   Apr. 7, 2016

Related U.S. Application Data

(63) Continuation-in-part of application No. 13/967,159, filed on Aug. 14, 2013, now Pat. No. 9,232,565.

(51) Int. Cl.
*H04W 88/10* (2009.01)
*H04B 1/12* (2006.01)
(Continued)

(52) U.S. Cl.
CPC .......... *H04W 88/10* (2013.01); *H04B 1/0021* (2013.01); *H04B 1/0046* (2013.01);
(Continued)

(58) Field of Classification Search
None
See application file for complete search history.

(56) References Cited

U.S. PATENT DOCUMENTS

| | | |
|---|---|---|
| 7,424,066 B2 | 9/2008 | Montalvo et al. |
| 2002/0058491 A1 | 5/2002 | Minnis et al. |

(Continued)

FOREIGN PATENT DOCUMENTS

| | | |
|---|---|---|
| CN | 1440588 | 9/2003 |
| CN | 102754332 | 10/2012 |

OTHER PUBLICATIONS

CN Office Action (OA1) mailed in CN Patent Application Serial No. 201410398212.X dated Apr. 5, 2017, 8 pages.

(Continued)

*Primary Examiner* — Hassan A Phillips
*Assistant Examiner* — Gautam Sharma
(74) *Attorney, Agent, or Firm* — Patent Capital Group

(57) ABSTRACT

Embodiments of the present invention may provide a receiver. The receiver may include an RF section, a local oscillation signal generator to generate quadrature local oscillation signals, and a quadrature mixture, coupled to the RF section, to downconvert a first group of wireless signals directly to baseband frequency quadrature signals and to downconvert a second group of wireless signals to intermediate frequency quadrature signals. The receiver may also include a pair of analog-to-digital converters (ADCs) to convert the downconverted quadrature signals to corresponding digital quadrature signals. Further, the receiver may include a digital section having two paths to perform signal processing on the digital baseband frequency quadrature signals and to downconvert the digital intermediate frequency signals to baseband cancelling a third order harmonic distortion therein. Moreover, the receiver may include a phase corrector to adjust a phase of one of the local oscillation signals to balance the third order harmonic distortion and a gain offset generator to adjust a gain of one of (Continued)

the downconverted signals to balance the third order harmonic distortion.

20 Claims, 9 Drawing Sheets

(51) Int. Cl.
*H04B 1/10* (2006.01)
*H04B 1/00* (2006.01)
*H04B 15/04* (2006.01)

(52) U.S. Cl.
CPC .......... *H04B 1/1036* (2013.01); *H04B 1/123* (2013.01); *H04B 15/04* (2013.01)

(56) References Cited

U.S. PATENT DOCUMENTS

| | | |
|---|---|---|
| 2005/0197090 A1 | 9/2005 | Stockstad et al. |
| 2006/0077083 A1* | 4/2006 | Kiriyama ........... G01D 5/24452 341/120 |
| 2006/0165196 A1 | 7/2006 | Montalvo et al. |
| 2011/0316062 A1 | 12/2011 | Kondo et al. |
| 2012/0313672 A1 | 12/2012 | Andersson et al. |

OTHER PUBLICATIONS

Ma Guosheng et al., *Direct-down conversion receiver system design is based upon TRF3710 with high linearity quadrature demodulator*, Mar. 27, 2003, 5 pages.

* cited by examiner

100

200

300

400

600

700

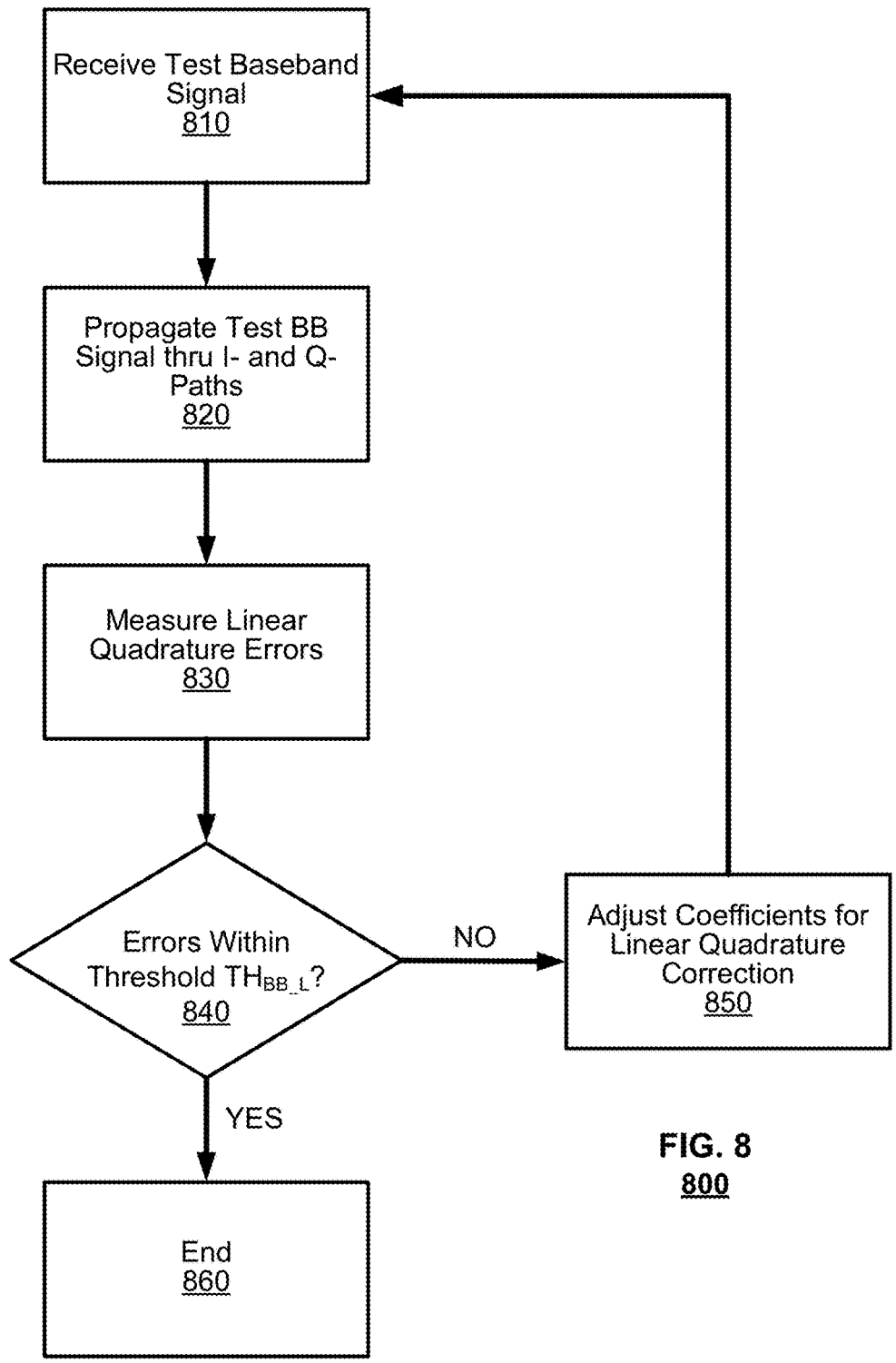

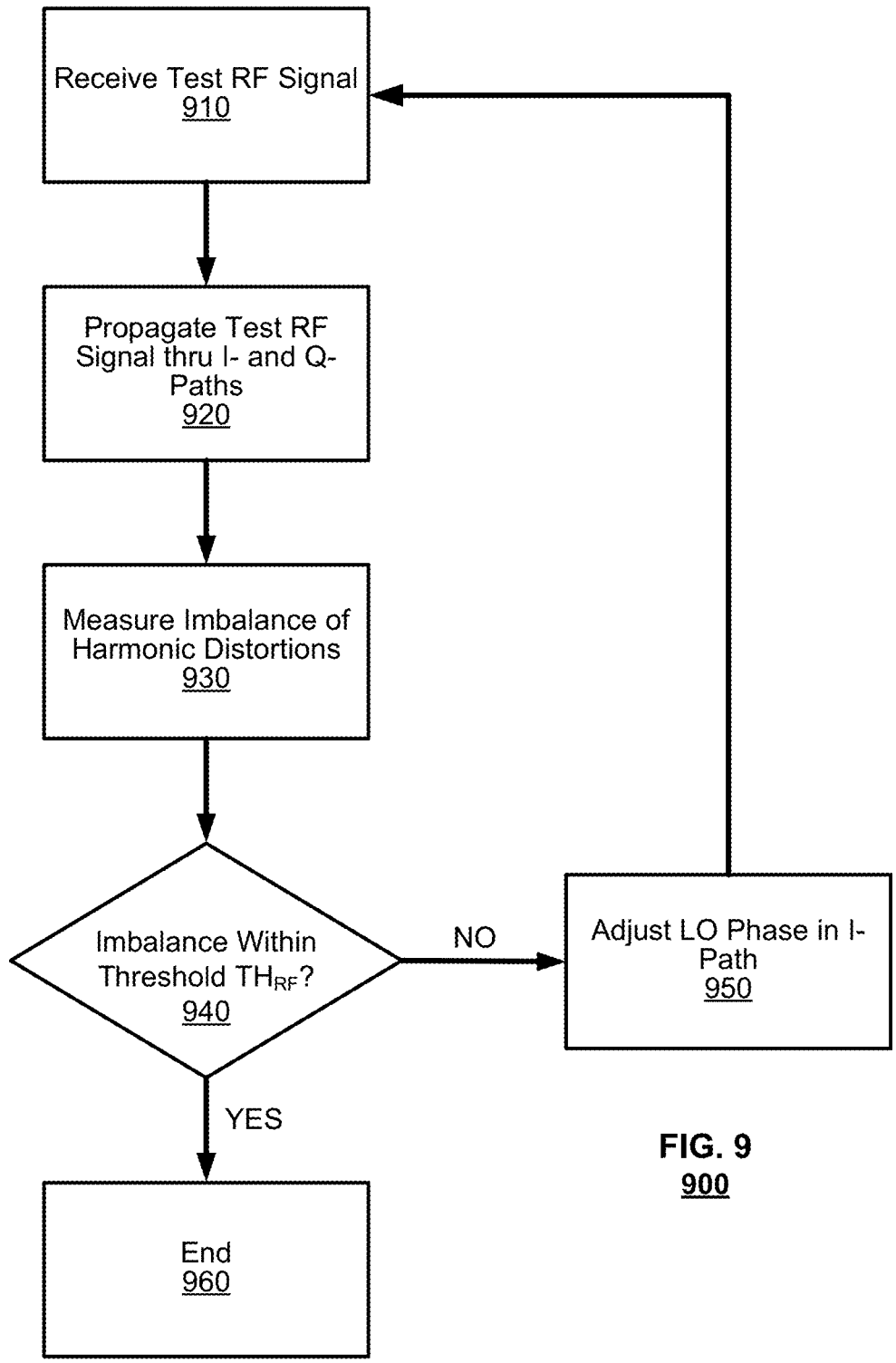

MULTI-CARRIER BASE STATION RECEIVER

PRIORITY

This application is a Continuation-In-Part application of U.S. patent application Ser. No. 13/967,159 filed Aug. 14, 2013, entitled "Multi-Carrier Base Station Receiver," the content of which is incorporated herein in its entirety.

BACKGROUND

The present invention relates to wireless communication receivers, in particular to monolithically integrated receivers that are configurable for multi-carrier, multi-band operation.

Cellular technology is constantly evolving to support growing widespread wireless technology usage. Recently, popular wireless standardized technology has progressed from GSM (Global System for Mobile Communication) to WCDMA (Wideband Code Division Multiple Access) to LTE (Long Term Evolution). However, when a new wireless standard emerges, the previous standard version does not become obsolete because devices supporting the previous standard are still in use. In fact, two or more prior standard generation devices are typically still in circulation. Thus, wireless communication providers desire to support all standard generation devices that are in circulation concurrently.

In recent years, base station receivers capable of receiving multiple carriers with a single signal path have become commonplace. The advantage of these multi-carrier receivers is lower cost and smaller size as compared to a system made with receivers dedicated to each carrier.

Because different standards provide different signal characteristics, network equipment such as base station receivers have to be complex enough to support the different signal characteristics. Direct conversion receivers are emerging for WCDMA and LTE standards. Direct conversion refers to downconverting directly from radio frequency (RF) to baseband. While direct conversion eliminates circuit components, which lowers receiver costs, direct conversion also has drawbacks such as sensitivity to finite image rejection and harmonic distortion. WCDMA and LTE standard signals lend themselves for direct conversion because of their relatively low image-rejection requirement (~70 dB). MC-GSM (Multi-Carrier GSM), on the other hand, has proved to be too difficult for direct conversion due to its large in-band blockers (−25 dBm in DCS/PCS bands and −16 dBM in GSM850/GSM900 bands) resulting in a ~90 dB image rejection and harmonic distortion rejection requirement which isn't practical with known techniques.

Consequently, MC-GSM typically employs heterodyne conversion using intermediate frequency (IF) sampling. These conventional MC-GSM heterodyne receivers generally are not amenable to monolithic integration. For instance, IF filters and anti-aliasing filters used in heterodyne receivers typically require large inductors that are not practicable for silicon fabrication. In contrast, WCDMA and LTE receivers can use direct conversion receivers. The inability to support MC-GSM with a direct-conversion receiver prevents the development of a single platform that can support all standards.

Therefore, the inventors recognized a need in the art for a base station receiver that supports different standard signals, such as MC-GSM and WCDMA/LTE, with a single monolithic receiver.

BRIEF DESCRIPTION OF THE DRAWINGS

FIG. 8 illustrates a simplified process flow of calibration operations according to an embodiment of the present invention.

FIG. 9 illustrates a simplified process flow of calibration operations according to an embodiment of the present invention.

DETAILED DESCRIPTION

Embodiments of the present invention may provide a receiver. The receiver may include an RF section and a quadrature mixture, coupled to the RF section, to downconvert a first group of wireless signals directly to baseband frequency quadrature signals and to downconvert a second group of wireless signals to intermediate frequency quadrature signals. The receiver may also include a pair of analog-to-digital converters (ADCs) to convert the downconverted quadrature signals to corresponding digital quadrature signals. Further, the receiver may include a digital section having two paths to perform signal processing on the digital baseband frequency quadrature signals and to downconvert the digital intermediate frequency signals to baseband cancelling a third order harmonic distortion therein. The receiver may be provided on a monolithically integrated circuit.

Figure 1:
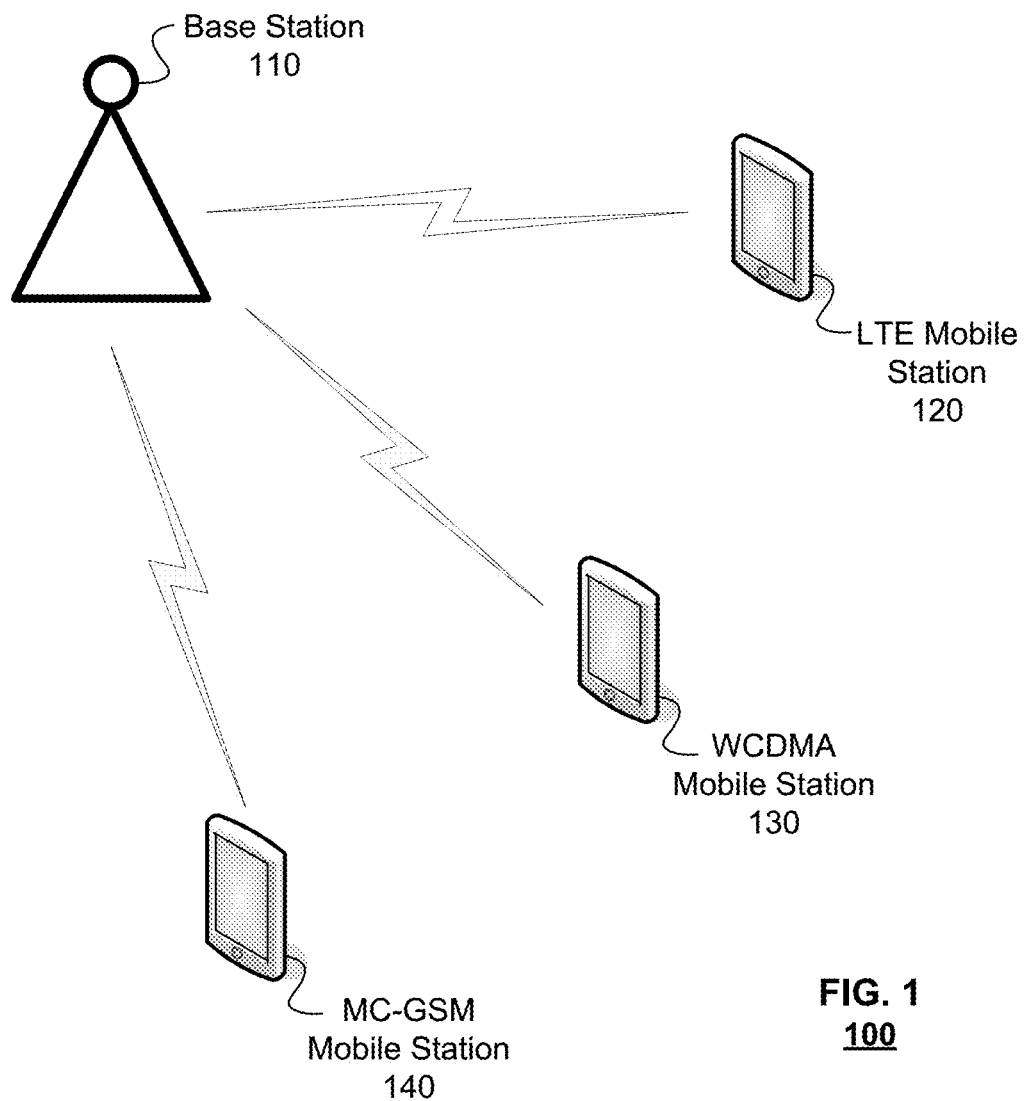
FIG. 1 illustrates a wireless communication system according to an embodiment of the present invention.

FIG. 1 illustrates a wireless communication system 100 according to an embodiment of the present invention. The wireless communication system 100 may include a base station 110 and a plurality of mobile stations 120-140. The base station 110 may be coupled to backend network (not shown) of the wireless communication system and may provide communication between the mobile stations 120-140 and the backend network. Of course, the wireless communication system 100 may include a plurality of base stations arranged in cells, and only one base station 110 is shown in FIG. 1 for simplicity and illustration purposes.

The wireless communication system 100 may support multiple standards and multiple band communication. For example, the wireless communication system may support LTE, WCDMA, and MC-GSM standard communication as illustrated with LTE mobile station 120, WCDMA mobile station 130, and MC-GSM mobile station 140 in FIG. 1; however, the use of these listed standards is merely exemplary and other standards also may be supported by the wireless communication system 100. In addition to multiple standard capabilities, the wireless communication system 100 may also support multiple communication bands. For example, the wireless communication system 100 may support DCS/PCS bands and GSM850/GSM900 bands of MC-GSM.

The multiple standard, multiple band signals in the wireless communication system 100 may be classified into two groups. A first group may refer to the signals for which direct conversion is applicable, and a second group may refer to the signals for which direct conversion is not applicable. In the FIG. 1 example, LTE and WCDMA may fall in the first group for which direct conversion is applicable in a base station, and MC-GSM may fall in the second group for which direct conversion is not applicable in a base station. Although direct conversion provides benefits such as low system cost, improved out-of-band performance, low power dissipation, and low component cost, some standard performance requirements are not feasible with direct conversion. For example, since a received RF signal is mixed directly to base band in direct conversion, harmonic distortions and images may fall in band. And while some standard performance requirements are sufficiently low for direct conversion applications such as LTE and WCDMA that require approximately 70 dB image and harmonic rejection, other systems require higher performance not feasible with direct conversion such as MC-GSM that requires 90 dB rejection. Major sources of noise may include image signals and harmonic distortions—second and third order (HD2, HD3 respectively).

The base station 110 may support wireless communication with mobile stations 120-140 of various standard technologies as well as in multiple bands. The base station 110 may transmit signals to the mobile stations 120-140 in downlink signals and receive signals from the mobile stations 120-140 in uplink signals. Hence, the base station 110 may receive LTE compliant signals from mobile station 120, WCDMA signals from mobile station 130, and MC-GSM signals from mobile station 140. The base station 110 may convert the received signals to baseband signals to demodulate and extract information from therein.

Figure 2:
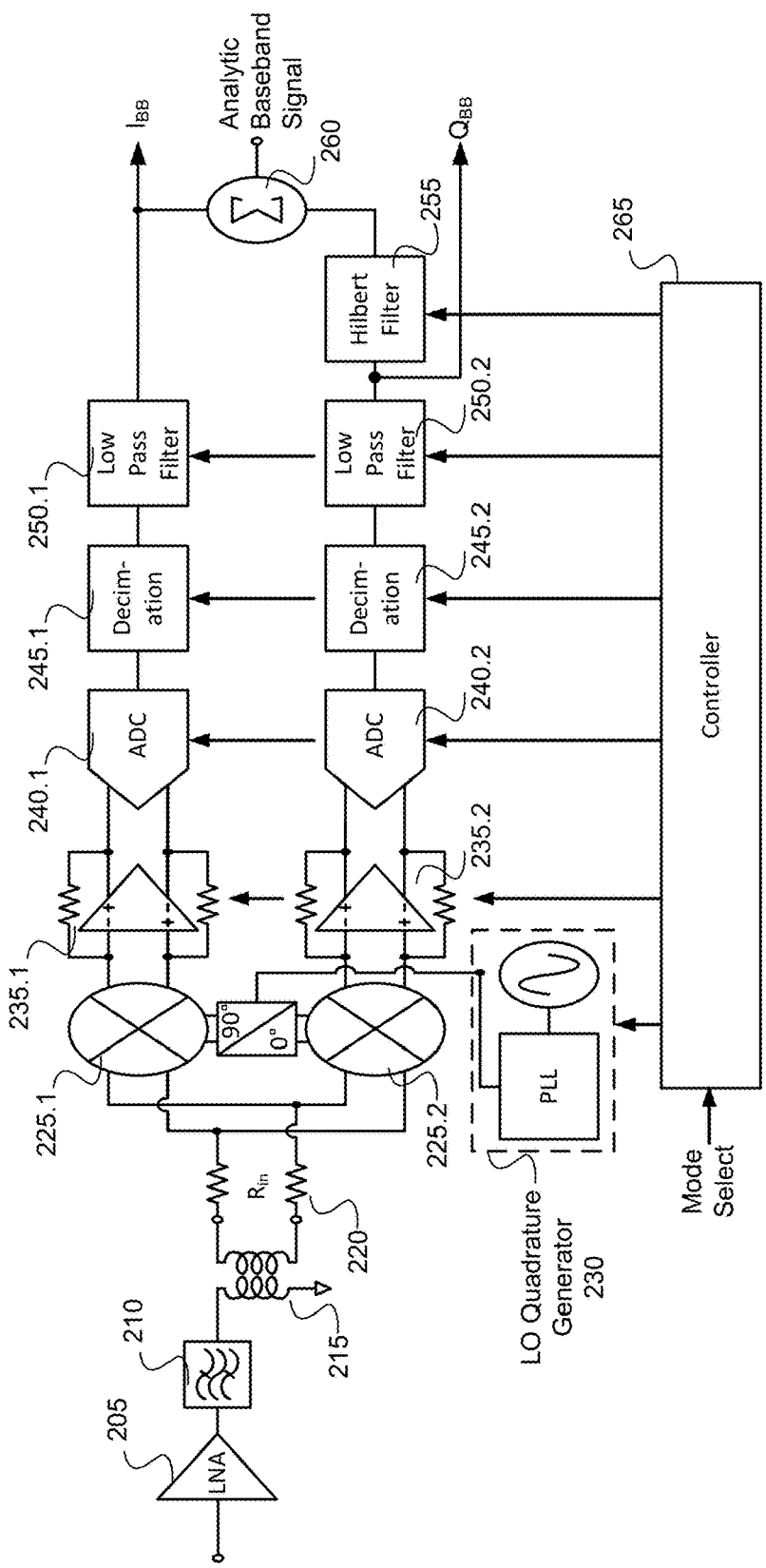
FIG. 2 illustrates a simplified block diagram of a receiver system according to an embodiment of the present invention.

FIG. 2 is a simplified block diagram of a receiver 200 according to an embodiment of the present invention. For example, the receiver 200 may be provided in the base station 110 of FIG. 1. The receiver 200 may support both aforementioned groups of signals—signals for which direct conversion is applicable (e.g., LTE, WCDMA) and signals for which direct conversion is not applicable (e.g., MC-GSM). Accordingly, the receiver 200 may be set to provide direct conversion for the first group of signals or to provide low IF conversion for the second group of signals (and first group) using common circuit components as a single monolithic receiver.

The receiver 200 may be provided on a monolithically integrated circuit. The base station receiver 200 may include a low noise amplifier (LNA) 205, a harmonic or band-pass filter 210, a transformer 215, input resistors Rin, 220, a pair of quadrature mixers 225.1-225.2, a pair of current-to-voltage amplifiers 235.1-235.2, a pair of analog-to-digital converters (ADCs) 240.1-240.2, a pair of decimation filters 245.1-245.2, a pair of low pass filters 250.1-250.2, a Hilbert filter 255, a summer 260, and a controller 265.

An input of the LNA 205 may be coupled to an antenna port, which, in turn, may be coupled to an antenna (not shown). The antenna may receive RF signals, and the LNA 205 may amplify the received RF signals. The LNA 205 may be coupled to the harmonic filter 210 that filters received RF signals that have been amplified by the LNA 205.

The harmonic or band-pass filter 210 may be coupled to the transformer 215. The transformer 215 may be provided as a balun matching transformer. The transformer 215 may convert the received signal into a balanced signal (i.e., two signals). The balanced side of the transformer 215 may be coupled to the input resistors Rin 220. The input resistors 220 may convert the RF voltage signal to a current RF signal. The input resistors 220 may be provided as substantially linear elements to keep the RF section of the base station receiver 200 relatively distortions free.

The input resistors 220 may be coupled to the pair of quadrature mixers 225.1-225.2. Each quadrature mixer 225.1-225.2 may include two inputs and one output. A first input may receive the RF signals, which may be current signals, from both balanced nodes of the input resistors 220. A second input of the quadrature mixers 225.1-225.2 may be coupled a local oscillator (LO) quadrature generator 230. The LO quadrature generator 230 may include a phase lock loop (PLL) and an oscillator. The LO quadrature generator 230 may generate LO signals at different frequencies based on the current received signal properties and frequency band. The controller 265 may receive a mode select input that corresponds to the current received signal properties and frequency band, and may control the LO quadrature generator 230 to generate an appropriate LO signal. The controller 265 may be pre-programmed for the specific band of operation based on the mode select. The mode select input may also convey which of the above-mentioned first or second group of signals the receiver may receive and process.

For first grouped signals, the quadrature mixers 225.1-225.2 may downconvert the RF signals directly to baseband signals, which may be substantially at or near 0 Hz. On the other hand, for second grouped signals, the quadrature mixers 225.1-225.2 may downconvert the RF signals to a low IF signals. For example, the low IF signals may be substantially at or near 10 MHz. The quadrature mixer 225.1 may generate an in-phase (I) downconverted signal, and its output may be provided to an I-signal path. The quadrature mixer 225.2 may generate a quadrature phase (Q) downconverted signal, and its output may be provided to a Q-signal path, which may be substantially 90 degrees out of phase with the I-signal path.

The outputs of the quadrature mixers 225.1-225.2 may be coupled to the current-to-voltage amplifiers 235.1-235.2, which may amplify and convert the downconverted signals to voltage signals. The current-to-voltage amplifiers 235.1-235.2 bandwidth may be tunable by the controller 265 to accommodate both the downconverted baseband signals belonging to the first group or, alternatively, the downconverted IF signals belonging to the second group. The controller 265 may adjust the bandwidth of the current-to-voltage amplifiers 235.1-235.2 based on the mode select.

The configuration of input resistors Rin 220, passive quadrature mixers 225.1-225.2 and the low input impedance of current-to-voltage amplifiers 235.1-235.2 may provide a highly linear RF signal path that keeps the RF section of the base station receiver 200 relatively free of distortion. The input of the current-to-voltage amplifiers 235.1-235.2 may provide a low impedance to the outputs of quadrature mixers 225.1-225.2. The low impedance of the current-to-voltage amplifiers 235.1-235.2 may be transferred to the input of quadrature mixers 225.1-225.2 when the quadrature mixers are implemented as passive switches. The low impedance at the RF and baseband signal terminals of quadrature mixers 225.1-225.2 ensures that the voltage signal will be small across the passive mixer terminals. The limited voltage signal swing across the passive mixer terminals results in a high linearity mode of operation from RF to the input of the current-to-voltage amplifiers.

The current-to-voltage amplifiers 235.1-235.2 may be coupled to the ADCs 240.1-240.2. The ADCs 240.1-240.2 may digitize the downconverted signals. The ADCs 240.1-240.2 may accommodate both the downconverted baseband signals belonging to the first group or, alternatively, the downconverted IF signals belonging to the second group. The controller 265 may adjust the bandwidth of the ADCs 240.1-240.2 based on the mode select.

The ADCs 240.1-240.2 may be coupled to the decimation filters 245.1-245.2. The decimation filters 245.1-245.2 may perform downsampling. The decimation filters 245.1-245.2 may accommodate both the downconverted baseband signals belonging to the first group or, alternatively, the downconverted IF signals belonging to the second group. The controller 265 may adjust the bandwidth of the decimation filters 245.1-245.2 based on the mode select.

The decimation filters 245.1-245.2 may be coupled to the low pass filters 250.1-250.2. The low pass filters 250.1-250.2 may perform low pass filtering. The low pass filters 250.1-250.2 may accommodate both the downconverted baseband signals belonging to the first group or, alternatively, the downconverted IF signals belonging to the second group. The controller 265 may adjust the bandwidth of the low pass filters 250.1-250.2 based on the mode select.

Moreover, the decimation filters 245.1-245.2 and low pass filters 250.1-250.2 may be tunable to suppress undesired signal characteristics.

The Hilbert filter 255 may be coupled to low pass filter 250.2 in the Q-signal path. The Hilbert filter 255 may shift the Q-signal by 90 degrees and perform a fourier transform. Outputs of the I-signal path low pass filter 250.1 and the Hilbert filter 255 may be coupled to the summer 260. The summer 260 may output an analytic baseband signal from which information may be extracted. The summer 260 output may be coupled to a baseband processor, which may extract the information. For direct conversion operations, the Hilbert filer 255 may be bypassed, and the in-phase and quadrature baseband signals may be output from low pass filters 250.1, 250.2.

The receiver 200 may receive and downconvert signals employing different downconversion techniques—direct downconversion and low IF downconversion—based the mode selection. And the base station receiver 200 may be provided on a monolithically integrated circuit to support multiple previously incompatible standard technologies using the same receiver components for the different downconversion techniques. Further, digital signal processing of the low IF conversion may cancel relevant HD3 components in addition to suppressing HD2 components to acceptable levels for standard requirements such as for MC-GSM. Therefore, the receiver 200 provides an improved receiver architecture that is cost effective for its reuse of circuit components for different downconversion accommodation in a monolithically integrated circuit while providing improved communication quality.

Figure 3:
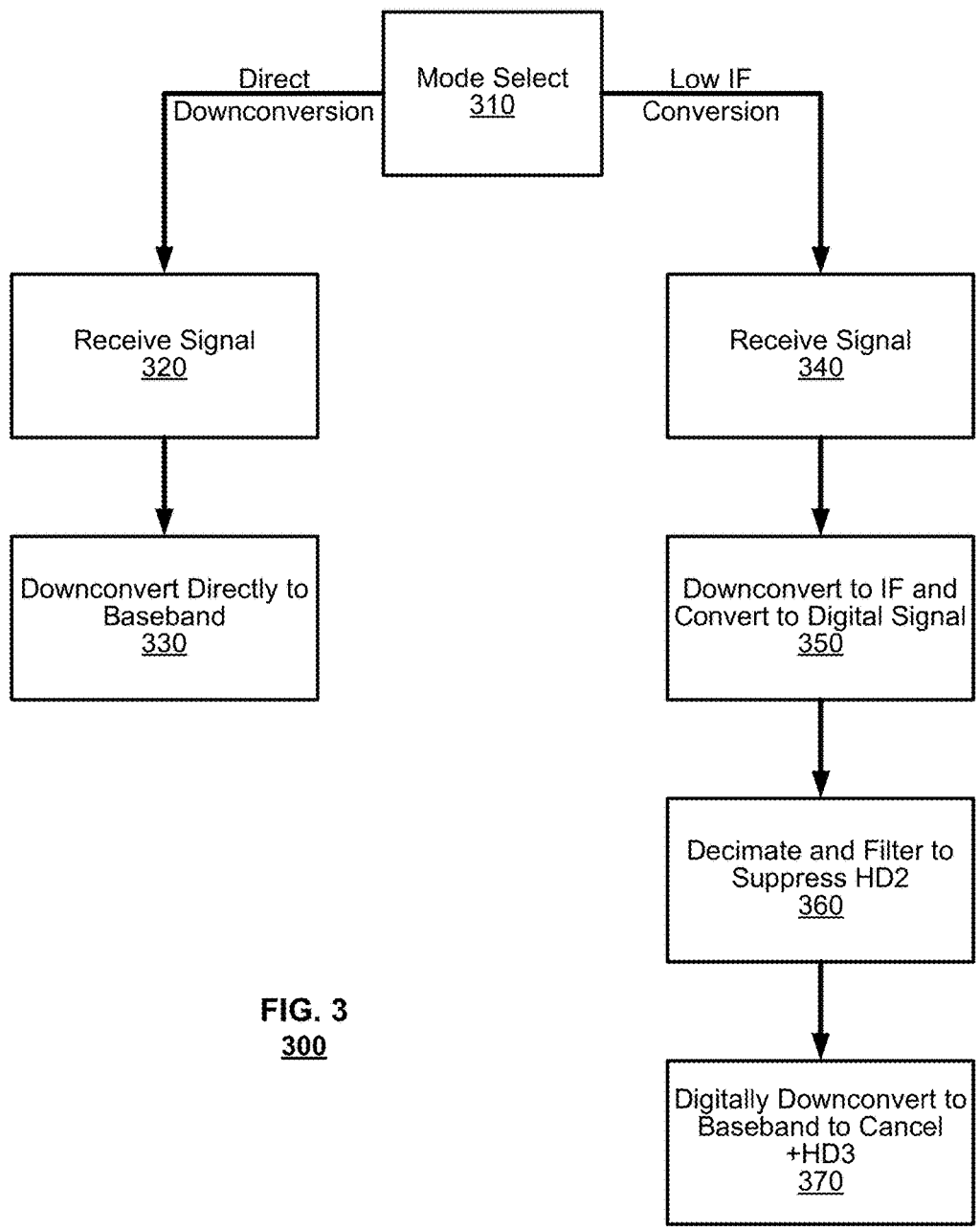
FIG. 3 illustrates a simplified process flow of receiver operations according to an embodiment of the present invention.

FIG. 3 illustrates a process 300 to receive multi-standard wireless signals using a common receiver according to an embodiment of the present invention. For example, the process 300 may be performed by the receiver 200 of FIG. 2. In step 310, a mode may be selected. The mode may correspond to whether the receiver will operate in direct downconversion or low IF downconversion mode. For example, an operator may set the mode at the time of installation. Based on the mode, the controller 265 may set the band of operation for the LO Quadrature generator 230 and other receiver components.

If direct downconversion mode is selected, a signal may be received in step 320. The received signal may be propagated through a common RF section. For example, the receive signal may be amplified, harmonically filtered, and converted to a balanced RF signal using common RF circuit components such as a common LNA 205, harmonic filter 210, and transformer 220 as shown of FIG. 2. Further, the received signal, which may be a voltage signal, may be converted to a current signal.

In step 330, the received signal may be downconverted directly to baseband. The downconversion may be performed by a quadrature mixer that downconverts the received signal to substantially at or near 0 Hz (i.e., baseband). The baseband signal may be converted back to a voltage signal and then digitized. The baseband signal may be further processed for image rejection and harmonic distortions suppression. Because of the direct downconversion to baseband, HD2 and HD3 may fall in band and may have to be suppressed accordingly. The suppression may be performed via analog filtering, digital filtering, and/or decimation. In an embodiment, the image and harmonic distortion may be suppressed to 70 dB or below. In direct conversion, the digital signal may bypass the Hilbert filter 255 of receiver 200 in FIG. 2, and the baseband signals (IBB and QBB) may be output from the low pass filters 250.1, 250.2. In an embodiment, direct downconversion mode may be well suited for LTE and WCDMA signals.

If low IF conversion mode is selected, a signal may be received in step 320. The received signal may be propagated through a common RF section. For example, the receive signal may be amplified, harmonically filtered, and converted to a balanced RF signal using common RF circuit components such as a common LNA 205, harmonic filter 210, and transformer 215 as shown of FIG. 2. Further, the received signal, which may be a voltage signal, may be converted to a current signal.

In step 350, the received signal may be downconverted to a low IF signal. In an embodiment, low IF conversion mode mode may be well suited for MC-GSM signals; however, it may be also be used for LTE and WCDMA signals. The downconversion may be performed by a quadrature mixer that downconverts the RF signal to the low IF signal, which may be substantially at or near 10 MHz. For example, the same quadrature mixer may be configurable to directly downconvert the LTE and WCDMA signals to baseband as well as to downconvert the MC-GSM signals to low IF, based on the mode select. The low IF signal may be converted back to a voltage signal and then digitized.

The low IF signal may be further processed for image rejection and harmonic distortions suppression. In step 345, the low IF signal may be decimated (i.e., downsampled) and filtered dynamically to suppress HD2 components. For example, an analytic baseband signal may be generated by summing the "I" path and "Q" path, which includes the Hilbert filter 255, by summer 260. In an embodiment, if the RF signal is a 2-tone signal, the quadrature low-IF (baseband) signal may be expressed as:

$$I_{BB}(t) = A \cos(\omega_1 t) + A \cos(\omega_2 t)$$

$$Q_{BB}(t) = A \sin(\omega_1 t) + A \sin(\omega_2 t)$$

where A is the amplitude (i.e., magnitude), and ω1 and ω2 represent the carrier frequency.

These signals may be squared to correct even-order non-linearity, which may be expressed as:

$$I_{BB}^2(t) = A^2[\cos(\omega_1 t) + \cos(\omega_2 t)]^2$$
$$= \frac{A^2}{2}\{2 + \cos(2\omega_1 t) + \cos(2\omega_2 t) +$$
$$2\cos[(\omega_2 - \omega_1)t] + 2\cos[(\omega_1 + \omega_2)t]\}$$

$$jQ_{BB}^2(t) = jA^2[\sin(\omega_1 t) + \sin(\omega_2 t)]^2$$
$$= j\frac{A^2}{2}\{2 - \cos(2\omega_1 t) - \cos(2\omega_2 t) +$$
$$2\cos[(\omega_2 - \omega_1)t] - 2\cos[(\omega_1 + \omega_2)t]\}$$

The squared signals may be summed to generate a complex baseband signal, which may be expressed as:

$$I_{BB}^2(t) + jQ_{BB}^2(t) =$$
$$\frac{A^2}{2}\{2 + \cos(2\omega_1 t) + \cos(2\omega_2 t) + 2\cos[(\omega_2 - \omega_1)t] + 2\cos[(\omega_1 + \omega_2)t]\} +$$
$$j\frac{A^2}{2}\{2 - \cos(2\omega_1 t) - \cos(2\omega_2 t) + 2\cos[(\omega_2 - \omega_1)t] - 2\cos[(\omega_1 + \omega_2)t]\}$$

Note that while HD2 components appear on both sidebands, the HD2 components are substantially (~6 dB) lower than IM2 components.

Also, the low IF signal may be digitally downconverted to baseband using a harmonic filter. During this signal processing, positive HD3 (+HD3) may be cancelled. Consider the same input signal discussed above that may be cubed to correct third-order non-linearity, which may be expressed as:

$$I_{BB}^3(t) = A^3[\cos(\omega_1 t) + \cos(\omega_2 t)]^3$$
$$= A^3 \left\{ \begin{array}{l} \frac{9}{4}[\cos(\omega_1 t) + \cos(\omega_2 t)] + \frac{1}{4}[\cos(3\omega_1 t) + \cos(3\omega_2 t)] + \\ \frac{3}{4}\{\cos[(2\omega_2 - \omega_1)t] + \cos[(2\omega_1 - \omega_2)t] + \\ \cos[(2\omega_2 + \omega_1)t] + \cos[(2\omega_1 + \omega_2)t]\} \end{array} \right\}$$

$$jQ_{BB}^3(t) = jA^3[\sin(\omega_1 t) + \sin(\omega_2 t)]^3$$
$$= A^3 \left\{ \begin{array}{l} \frac{9}{4}[\cos(\omega_1 t) + \cos(\omega_2 t)] - \frac{1}{4}[\cos(3\omega_1 t) + \cos(3\omega_2 t)] + \\ \frac{3}{4}\{\cos[(2\omega_2 - \omega_1)t] + \cos[(2\omega_1 - \omega_2)t] - \\ \cos[(2\omega_2 + \omega_1)t] - \cos[(2\omega_1 + \omega_2)t]\} \end{array} \right\}$$

The cubed signals may be summed to generate a complex baseband signal, which may be expressed as:

$$I_{BB}^3(t) + jQ_{BB}^3(t) =$$
$$A^3 \left\{ \begin{array}{l} \frac{9}{4}[e^{j\omega_1 t} + e^{j\omega_2 t}] + \frac{1}{4}[e^{-j3\omega_1 t} + e^{-j3\omega_2 t}] + \\ \frac{3}{4}\{e^{j(2\omega_2-\omega_1)t} + e^{j(2\omega_1-\omega_2)t} + e^{-j(2\omega_2+\omega_1)t} + e^{-j(2\omega_1+\omega_2)t}\} \end{array} \right\}$$

Note that the 3rd order term is only on the opposite (negative) side-band and has been eliminated in the positive side-band.

Figure 4:
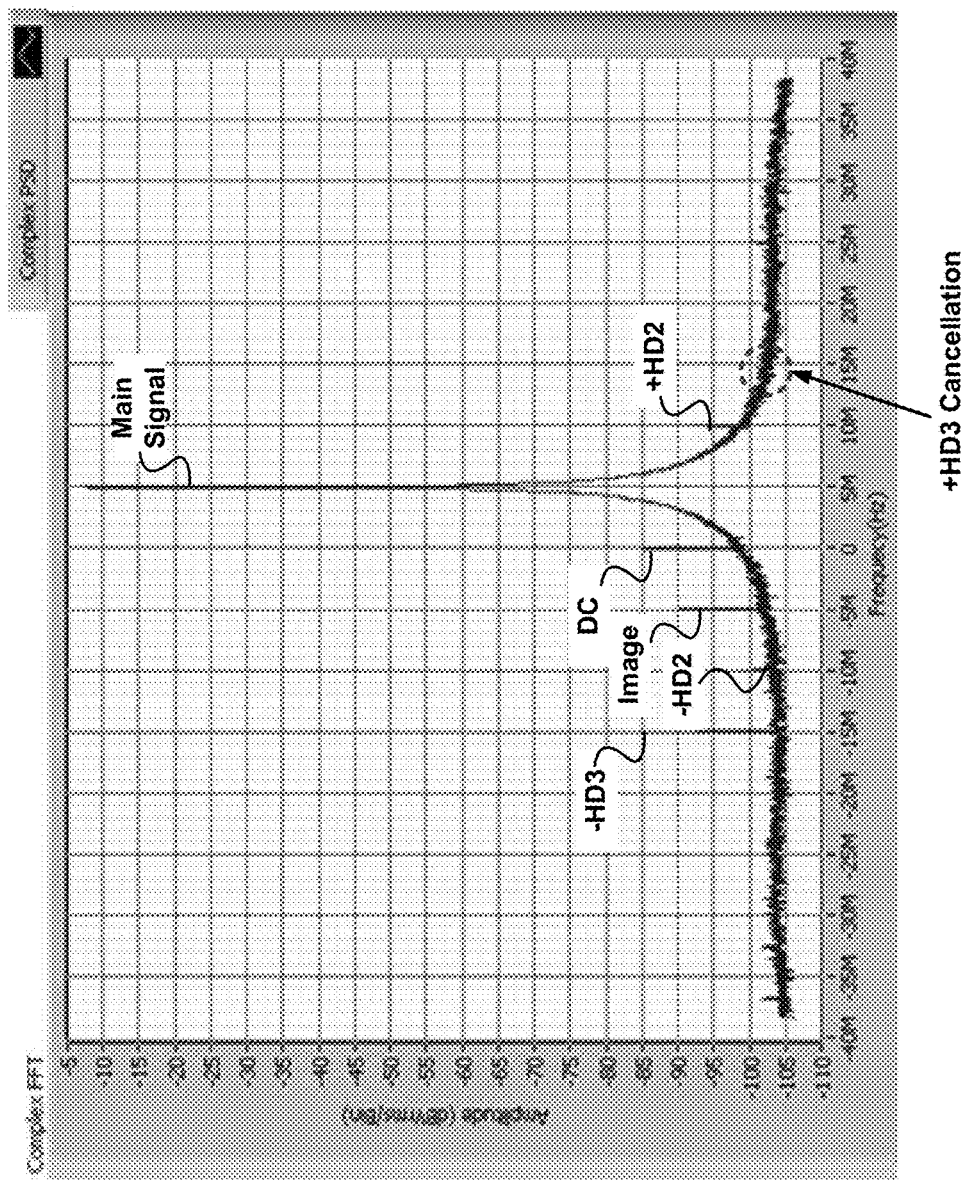
FIG. 4 illustrates signals generated by a receiver system according to an embodiment of the present invention.

FIG. 4 illustrates an exemplary simulation plot 400 of a MC-GSM signal downconverted using low-IF downconversion techniques on a monolithically integrated circuit as described herein. Here, a main signal is shown centered at or near 5 Mhz. +HD2 is shown to be sufficiently suppressed to approximately −95 dB, which is under the MC-GSM acceptable amount. Note that +HD3 is substantially cancelled as it would appear at or near 15 MHz.

Figure 5:
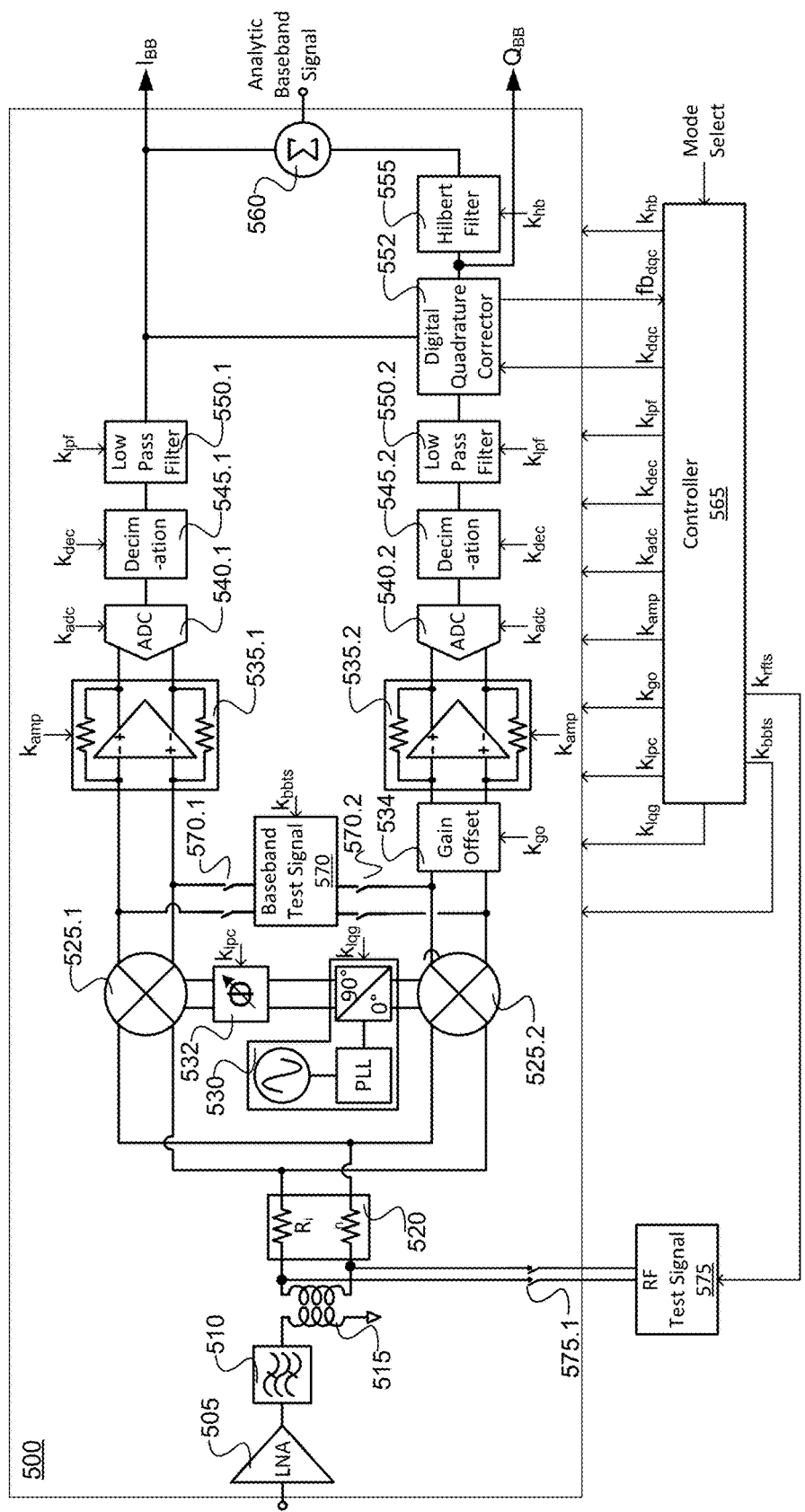
FIG. 5 illustrates a simplified block diagram of a receiver system according to an embodiment of the present invention.

FIG. 5 is a simplified block diagram of a receiver 500 according to an embodiment of the present invention. For example, the receiver 500 may be provided in the base station 110 of FIG. 1. The receiver 500 may support both aforementioned groups of signals—signals for which direct conversion is applicable (e.g., LTE, WCDMA) and signals for which direct conversion is not applicable (e.g., MC-GSM). Accordingly, the receiver 500 may be set to provide direct conversion for the first group of signals or to provide low IF conversion for the second group of signals (and first group) using common circuit components as a single monolithic receiver. The receiver 500 is similar to the receiver 200 (FIG. 2), but may include additional components to balance distortions that may be present in the I-signal path and the Q-signal path for more effective suppression or cancellation of the harmonics, as will be discussed below.

The receiver 500 may be provided on a monolithically integrated circuit. The receiver 500 may include a low noise amplifier (LNA) 505, a harmonic or band-pass filter 510, a transformer 515, input resistors Rin 520, a pair of quadrature mixers 525.1-525.2, a local oscillator (LO) quadrature generator 530, a LO phase corrector 532, a gain offset generator 534, a pair of current-to-voltage amplifiers 535.1-535.2, a pair of analog-to-digital converters (ADCs) 540.1-540.2, a pair of decimation filters 545.1-545.2, a pair of low pass filters 550.1-550.2, a digital quadrature corrector 552, a Hilbert filter 555, and a summer 560.

The receiver 500 may be coupled to a controller 565, a baseband test signal generator 570, and an RF test signal generator 575. Alternatively, one or more of the controller 565, the baseband test signal generator 570, and the RF test signal generator 575 may be incorporated into the receiver 500 on the same monolithically integrated circuit. The baseband test signal generator 570 may be selectively coupled to the I- and Q-signal paths in between the quadrature mixers 525.1-525.2 and current-to-voltage amplifiers 535.1-535.2 via pairs of switches 570.1, 570.2. In an embodiment, the baseband test signal generator 570 may include an oscillator and a PLL. The RF test signal generator 575 may be coupled between the transformer 515 and input resistors Rin 520. In an embodiment, the RF test signal generator 575 may include an oscillator and a PLL.

An input of the LNA 505 may be coupled to an antenna port, which, in turn, may be coupled to an antenna (not shown). The antenna may receive RF signals, and the LNA 505 may amplify the received RF signals. The LNA 505 may be coupled to the harmonic filter 510 that filters received RF signals that have been amplified by the LNA 505.

The harmonic or band-pass filter 510 may be coupled to the transformer 515. The transformer 515 may be provided as a balun matching transformer. The transformer 515 may convert the received signal into a balanced signal (i.e., two signals). The balanced side of the transformer 515 may be coupled to the input resistors Rin 520. The input resistors Rin 520 may convert the RF voltage signal to a current RF signal. The input resistors Rin 520 may be provided as substantially linear elements to keep the RF section of the receiver 500 relatively distortions free.

The input resistors Rin 520 may be coupled to the pair of quadrature mixers 525.1-525.2. Each quadrature mixer 525.1-525.2 may include two inputs and one output. A first input may receive the RF signals, which may be current signals, from both balanced nodes of the input resistors 520. A second input of the quadrature mixers 525.1-525.2 may be coupled to the LO quadrature generator 530. The LO quadrature generator 530 may include an oscillator, a phase lock loop (PLL), and a phase splitter. The LO quadrature generator 530 may generate LO signals at different frequencies based on the current received signal properties and frequency band. The controller 565 may receive a mode select input that corresponds to the current received signal properties and frequency band, and may control the LO quadrature generator 530 to generate appropriate LO signals. The controller 565 may be pre-programmed for the specific band of operation based on the mode select. The mode select input may also convey which of the above-mentioned first or second group of signals the receiver may receive and process.

For first grouped signals, the quadrature mixers 525.1-525.2 may downconvert the RF signals directly to baseband signals, which may be substantially at or near 0 Hz. On the other hand, for second grouped signals, the quadrature mixers 525.1-525.2 may downconvert the RF signals to low IF signals. For example, the low IF signals may be substantially at or near 10 MHz. The quadrature mixer 525.1 may generate an in-phase (I) downconverted signal, and its output may be provided to an I-signal path. The quadrature mixer 525.2 may generate a quadrature phase (Q) downconverted signal, and its output may be provided to a Q-signal path, which may be substantially 90 degrees out of phase with the I-signal path.

RF HD3 may be generated by the LNA 505 and/or the quadrature mixers 525.1-525.2 when downconverting the RF signals. If there is quadrature balance at the third-order harmonic LO frequency, in the complex spectrum of the receiver output, the downconverted RF HD3 may appear on the opposite sideband as the desired signal. However, if there is quadrature error at the third-order harmonic LO frequency, the image suppression of the downconverted RF HD3 may be finite and may result in baseband HD3 on the desired signal sideband. For example, RF harmonic distortion present at the input of the mixer is downconverted in frequency by the harmonic mixing transfer of the mixer. A balanced commutating switch mixer, such as an active Gilbert cell mixer or a passive FET mixer, may have harmonic transfer functions for odd-order harmonics of the LO signal. The downconverted RF HD3 resulting may appear at the third harmonic of the downconverted desired signal and may be indistinguishable from the third harmonic distortion that may be produced by subsequent baseband processing circuits.

To correct quadrature error, the LO phase corrector 532 may be provided in the path between the LO quadrature generator 530 and the quadrature mixer 525.1. The LO phase corrector 532 may be calibrated to include a phase correction in the LO signal provided to the quadrature mixer 525.1. Alternatively, the LO phase corrector 532 may be provided in the path between the LO quadrature generator 530 and the quadrature mixer 525.2 and the LO phase corrector 532 may be calibrated to include a phase correction in the LO signal provided to the quadrature mixer 525.2. Calibration of the LO phase corrector 532 will be described below.

The outputs of the quadrature mixers 525.1-525.2 may be coupled to the current-to-voltage amplifiers 535.1-535.2. Mismatch between the I-signal and Q-signal paths, due to, for example, variations between components in each signal path, may result in a mismatch between baseband HD3 at the output of each signal path. The baseband HD3 mismatch typically arises because nonlinear responses of the signal paths are more sensitive to the mismatch between the signal paths than their linear responses. To correct the baseband HD3 mismatch, a gain offset generator 534 may be provided in one of the signal paths to adjust the gain of the signal path. Thus, the gain offset generator 534 may be provided in the Q-signal path between the quadrature mixer 525.2 and the current-to-voltage amplifier 535.2, as shown in FIG. 5. In an embodiment, the gain offset may be provided in the I-signal path between the quadrature mixer 525.1 and the current-to-voltage amplifier 535.1. In another embodiment, the gain offset may be provided in other locations of the Q-signal path (or I-signal path) such as after the current-to-voltage amplifier 535.2.

The current-to-voltage amplifiers 535.1-535.2 may amplify and convert the downconverted signals from the quadrature mixers 525.1-525.2, one of whose gains may have been adjusted by the gain offset generator 534, to voltage signals. The current-to-voltage amplifiers 535.1-535.2 bandwidth may be tunable by the controller 565 to accommodate both the downconverted baseband signals belonging to the first group or, alternatively, the downconverted IF signals belonging to the second group. The controller 565 may adjust the bandwidth of the current-to-voltage amplifiers 535.1-535.2 based on the mode select.

The current-to-voltage amplifiers 535.1-535.2 may be coupled to the ADCs 540.1-540.2. The ADCs 540.1-540.2 may digitize the downconverted signals. The ADCs 540.1-540.2 may accommodate both the downconverted baseband signals belonging to the first group or, alternatively, the downconverted IF signals belonging to the second group. The controller 565 may adjust the bandwidth of the ADCs 540.1-540.2 based on the mode select.

The ADCs 540.1-540.2 may be coupled to the decimation filters 545.1-545.2. The decimation filters 545.1-545.2 may perform downsampling. The decimation filters 545.1-545.2 may accommodate both the downconverted baseband signals belonging to the first group or, alternatively, the downconverted IF signals belonging to the second group. The controller 565 may adjust the bandwidth of the decimation filters 545.1-545.2 based on the mode select.

The decimation filters 545.1-545.2 may be coupled to the low pass filters 550.1-550.2. The low pass filters 550.1-550.2 may perform low pass filtering. The low pass filters 550.1-550.2 may accommodate both the downconverted baseband signals belonging to the first group or, alternatively, the downconverted IF signals belonging to the second group. The controller 565 may adjust the bandwidth of the low pass filters 550.1-550.2 based on the mode select.

Moreover, the decimation filters 545.1-545.2 and low pass filters 550.1-550.2 may be tunable to suppress undesired signal characteristics.

The digital quadrature corrector 552 may be coupled to the low pass filters 550.1-550.2 in the I-signal and Q-signal paths. The digital quadrature corrector 552 may provide non-linear imbalance detection and, in response, may generate a feedback signal, $fb_{dqc}$, for the controller 565 that is used to calibrate the LO phase corrector 532 and/or the gain offset corrector 534 using control signals $k_{lpc}$ and $k_{go}$, respectively. Embodiments of the calibration procedures will be described in further detail below. The digital quadrature corrector 552 may also correct linear balance errors. The digital quadrature corrector 552 may apply a correction function to correct for linear balance errors. The correction function may use coefficients, which may be calibrated using the calibration procedures described in further detail below. Based on the coefficients, the digital quadrature corrector 552 may adjust the Q-signal (or the I-signal) to correct for balance errors using the correction function.

The Hilbert filter 555 may be coupled to the digital quadrature corrector 552 in the Q-signal path. The Hilbert filter 555 may shift the Q-signal by 90 degrees and perform a fourier transform. Outputs of the I-signal path low pass filter 550.1 and the Hilbert filter 555 may be coupled to the summer 560. The summer 560 may output an analytic baseband signal from which information may be extracted. The summer 560 output may be coupled to a baseband processor, which may extract the information. For direct conversion operations, the Hilbert filter 555 may be bypassed, and the in-phase and quadrature baseband signals may be output from low pass filters 550.1, 550.2.

The receiver 500 may receive and downconvert signals employing different downconversion techniques—direct downconversion and low IF downconversion—based on the mode selection. And the receiver 500 may be provided on a monolithically integrated circuit to support multiple previously incompatible standard technologies using the same receiver components for the different downconversion techniques. Also, receiver 500 may balance the quadrature signals, including the harmonics therein, so that the digital signal processing of the low IF conversion may accurately cancel relevant HD3 components in addition to suppressing HD2 components to acceptable levels for standard requirements such as for MC-GSM. Therefore, the receiver 500 provides an improved receiver architecture that is cost effective for its reuse of circuit components for different downconversion accommodation in a monolithically integrated circuit while providing improved communication quality.

Figure 6:
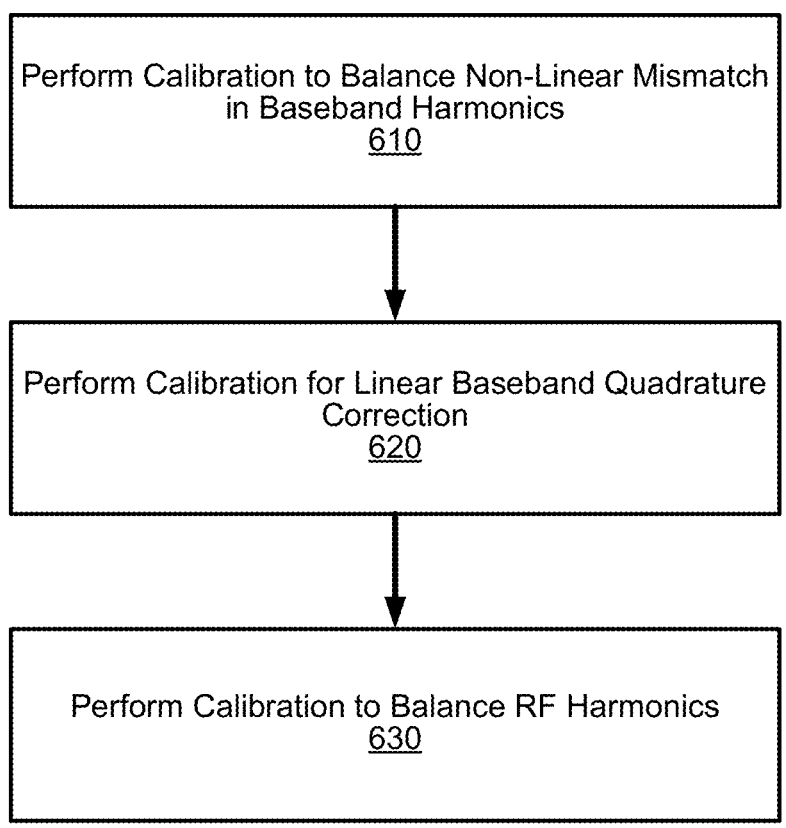
FIG. 6 illustrates a simplified process flow of calibration operations according to an embodiment of the present invention.
Figure 7:
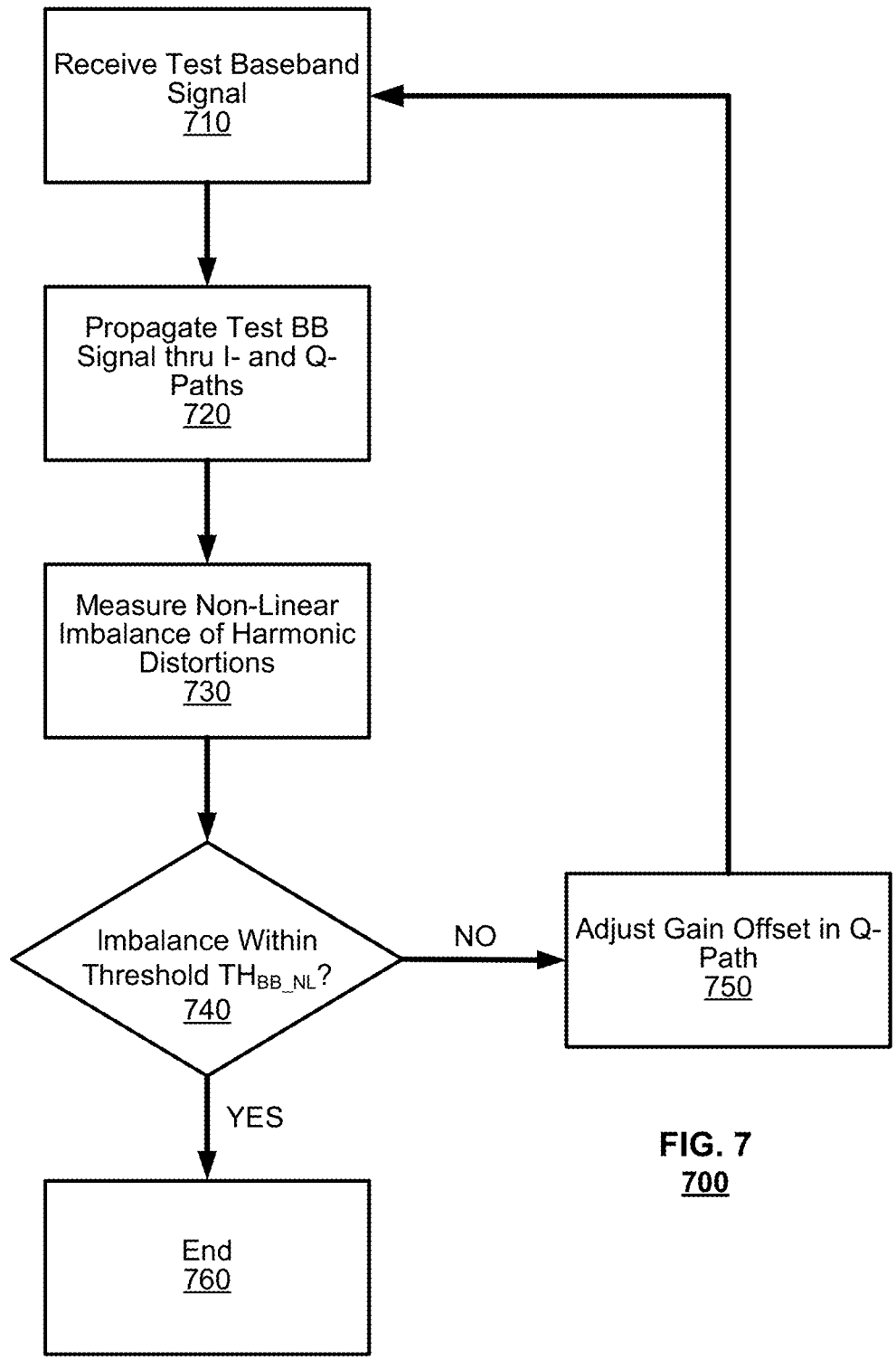
FIG. 7 illustrates a simplified process flow of calibration operations according to an embodiment of the present invention.

FIG. 6 illustrates a process 600 to calibrate a receiver, e.g., receiver 500 (FIG. 5). The process 600 may be performed before the receiver 500 is first operated, or in an embodiment, the process 600 may be performed periodically during operation. In step 610, a first calibration process may be performed to balance non-linear mismatch in baseband harmonics (e.g., BB HD3). An embodiment of this first calibration process is illustrated in FIG. 7 as process 700 using receiver components of receiver 500 as illustrated in FIG. 5.

In step 710, the baseband test signal generator 570 may generate a test baseband signal, which is received by the receiver 500 in both I and Q signal paths after the quadrature mixers 525.1-525.2 (and before current-to-voltage amplifiers 535.1-535.2) in an embodiment. The test baseband signal may be a low frequency signal (e.g., 0-100 MHz) and, in an embodiment, may be a sinusoidal signal. In an embodiment, the test baseband signal may be swept in frequency to determine changes in error over a frequency range of interest.

In step 720, the test baseband signal may be propagated through the I-signal path and the Q-signal paths. The test baseband signal may be converted to a voltage signal, digitized, decimated, and low-pass filtered by the current-to-voltage amplifiers 535.1-535.2, the analog-to-digital converters (ADCs) 540.1-540.2, the decimation filters 545.1-545.2, and the low pass filters 550.1-550.2 respectively.

In step 730, the digital quadrature corrector 552 may measure the non-linear imbalance of the harmonic distortions in the I- and Q-signals and may send the measured non-linear imbalance information to the controller 565 as part of the feedback signal $fb_{dqc}$. The non-linear imbalance information may include amplitude and phase differences between the quadrature signals, which may be measured by using a Fast Fourier Transform (FFT) of the I- and Q-signals. In step 740, the measured imbalance may be compared, by the controller 565, to a threshold $TH_{BB\_NL}$. If the measured non-linear imbalance is not within the threshold $TH_{BB\_NL}$, then, in step 750, the controller 565 may adjust the gain offset in the Q-signal path generated by the gain offset generator 534 based on the magnitude of the imbalance. For example, the gain offset in the Q-signal path may be increased or decreased depending on the degree of the imbalance detected. The gain offset may add an error in one of the quadrature paths to balance the distortions therein. The process 700, as described above, may be repeated until the measured imbalance is within $TH_{BB\_NL}$, at which time the process 700 is terminated in step 760. At the end of process 700, the calibrated value of the gain offset in the gain offset generator 534 may be stored for use in operational mode.

Returning to FIG. 6, in step 620, a second calibration process may be performed to correct linear baseband quadrature errors. An embodiment of this second calibration process is illustrated in FIG. 8 as process 800 using receiver components of receiver 500 as illustrated in FIG. 5.

In step 810, the baseband test signal generator 570 may generate a test baseband signal, which is received by the receiver 500 in both the I- and Q-signal paths after the quadrature mixers 525.1-525.2 (and before current-to-voltage amplifiers 535.1-535.2) in an embodiment. The test baseband signal may be a low frequency signal (e.g., 0-100 MHz) and, in an embodiment, may be a sinusoidal signal. In an embodiment, the test baseband signal for the second calibration process 800 may be the same type of signal used for the first calibration process 700 (FIG. 7) described above. In an embodiment, the test baseband signal may be swept in frequency to determine changes in error over a frequency range of interest.

In step 820, the test baseband signal may be propagated through the I-signal path and the Q-signal paths. The test baseband signal may be converted to a voltage signal, digitized, decimated, and low-pass filtered by the current-to-voltage amplifiers 535.1-535.2, the analog-to-digital converters (ADCs) 540.1-540.2, the decimation filters 545.1-545.2, and the low pass filters 550.1-550.2, respectively.

In step 830, the digital quadrature corrector 552 may measure the linear imbalance of the harmonic distortions in the I- and Q-signals and may send the measured linear imbalance information to the controller 565 as part of the feedback signal $fb_{dqc}$. The non-linear imbalance information may include amplitude and phase differences between the quadrature signals, which may be measured by using a Fast Fourier Transform (FFT) of both I- and Q-signals. In step 840, the measured imbalance may be compared, by the controller 565, to a threshold $TH_{BB\_L}$. If the measured linear imbalance is not within the threshold $TH_{BB\_L}$, then, in step 850, the controller 565 may adjust the coefficient(s) of the digital quadrature corrector 552 accordingly. For example, the digital quadrature corrector 552 may include one or more of complex compensating finite impulse response filters (CFIR), quadrature compensating finite impulse response filters (QFIR), scalar amount summers, etc., and the coefficient(s) that is adjusted may be associated with these elements. The process 800, as described above, may be repeated until the measured imbalance is within $TH_{BB\_L}$, at which time the process 800 is terminated in step 860. At the end of process 800, the calibrated value of the coefficient(s) of the digital quadrature corrector 552 may be stored for use in operational mode.

By applying an iterative procedure of balancing the harmonic distortion and subsequently correcting amplitude/ phase imbalance at the output may correct both the non-linear harmonic mismatch and the linear imbalances.

Returning to FIG. 6, in step 660, a third calibration process may be performed to balance harmonic distortions caused by RF components (e.g, RF HD3). An embodiment of this third calibration process is illustrated in FIG. 9 as process 900 using receiver components of receiver 500 as illustrated in FIG. 5.

In step 910, the RF test signal generator 575 may generate a test RF signal, which is received by the receiver 500 in both the I- and Q-signal paths before the quadrature mixers 525.1-525.2 in an embodiment. The test RF signal may be a radio frequency signal at around the same bandwidth of the aforementioned second group of signals and, in an embodiment, may be a sinusoidal signal. In an embodiment, the test RF signal may be swept in frequency to determine changes in error over a frequency range of interest.

In step 920, the test RF signal may be propagated through the I-signal path and the Q-signal paths. The test RF signal may be downcoverted by the quadrature mixers 525.1-525.2 using the LO signals generated by LO quadrature generator 530. The test signal may then be converted to a voltage signal, digitized, decimated, and low-pass filtered by the current-to-voltage amplifiers 535.1-535.2, the analog-to-digital converters (ADCs) 540.1-540.2, the decimation filters 545.1-545.2, and the low pass filters 550.1-550.2, respectively.

In step 930, the digital quadrature corrector 552 may measure the non-linear imbalance of the harmonic distortions in the I- and Q-signals and may send the measured non-linear imbalance information to the controller 565 as part of the feedback signal $fb_{dqc}$. In step 940, the measured imbalance may be compared, by the controller 565, to a threshold $TH_{RF}$. If the measured non-linear imbalance is not within the threshold $TH_{RF}$, then, in step 950, the controller 565 may adjust the phase of LO signal in the I-signal path using LO phase corrector 532 based on the magnitude of the imbalance. For example, the phase offset in the I-signal path may be increased or decreased depending on degree of the imbalance detected. The phase offset may add an error in one of the quadrature paths to balance the distortions therein. While the harmonic imbalance is measured at an operating fundamental frequency, the correction via the LO phase corrector 532 may be a wideband correction. The process 900, as described above, may be repeated until the measured imbalance is within $TH_{RF}$, at which time the process 900 is terminated in step 960. At the end of process 900, the calibrated value of the phase offset in the LO phase corrector 532 may be stored for use in operational mode.

Using the calibrated value of the phase offset in operational mode may balance the RF HD3 so that they may be cancelled in subsequent processing. Consider the quadrature low-IF receiver 500 (FIG. 5) described above that uses a direct conversion mixer architecture. Each quadrature mixer 525.1-525.2 downconverts the input signal and any odd-ordered harmonic distortion, and imparts the relative phase of the quadrature LO signals on the downconverted signal. A phase error Δ in the LO path multiplies the RF input signal including third harmonic distortion, x(t), to create quadrature baseband output signals, $y_I(t)$ and $y_Q(t)$, $$x(t) = A_1\cos(\omega t) + A_3\cos(3\omega t)$$

$$y_I(t) = \frac{4}{\pi}\left[A_1\cos(\omega t)\cos(\omega_{LO}t) - \frac{A_3}{3}\cos(3\omega t)\cos(3\omega_{LO}t)\right]$$

-continued $$y_Q(t) = \frac{4}{\pi}\left[A_1\cos(\omega t)\sin(\omega_{LO}t + \Delta) + \frac{A_3}{3}\cos(3\omega t)\sin(3\omega_{LO}t + 3\Delta)\right],$$

where the phase error at the third harmonic of the LO is three times the error at the fundamental frequency. The phase error may scale linearly with frequency for squarewave LO signals. The 180 degree phase inversion of the in-phase LO third harmonic may occur for square wave switching signals whose fundamentals are in phase quadrature. The frequency converted communication signal is represented by the complex signal representation:

$$y(t)=y_I(t)+jy_Q(t).$$

The resulting complex signal reveals that the downconverted third harmonic signals may appear only at the opposite frequency sideband as the desired signal when the third harmonic phase error, 3Δ, is zero:

$$y(t) = \frac{A_1}{\pi}[(1 + e^{-j\Delta})e^{j(\omega-\omega_{LO})t} + (1 - e^{-j\Delta})e^{-j(\omega-\omega_{LO})t}] -$$

$$\frac{2A_3}{3\pi}[(1 - e^{-j3\Delta})e^{j3(\omega-\omega_{LO})t} - (1 + e^{-j3\Delta})e^{-j3(\omega-\omega_{LO})t}]$$

Therefore, the LO phase corrector 532, which may be implemented as a variable delay element, may vary the phase at the fundamental frequency and proportionally at harmonics of the LO to correct RF harmonic imbalance. This allows subsequent baseband processing to cancel or suppress those RF harmonics in the desired band.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:
1. A receiver, comprising:
a radio frequency (RF) section;
a local oscillation signal generator to generate in-phase and quadrature local oscillation signals;
a quadrature mixer, coupled to the RF section and to the local oscillation signal generator, to downconvert a first group of wireless signals directly to baseband frequency quadrature signals and to downconvert a second group of wireless signals to intermediate frequency quadrature signals;
a pair of analog-to-digital converters (ADCs) to convert the baseband frequency quadrature signal and intermediate frequency quadrature signal to digital baseband frequency quadrature signal and digital intermediate frequency quadrature signal respectively;
a digital section having two paths to perform signal processing on the digital baseband frequency quadrature signals and to downconvert the digital intermediate frequency quadrature signal to baseband cancelling third order harmonic distortions therein;
a phase corrector to adjust a phase of one of the in-phase and quadrature local oscillation signals to balance the third order harmonic distortions; and
a gain offset generator to adjust a gain of one of the baseband frequency quadrature signal and intermediate frequency quadrature signal to balance the third order harmonic distortions.

2. The receiver of claim 1, wherein the first group includes Long Term Evolution (LTE) and/or Wideband Code Division Multiple Access (WCDMA) signals.

3. The receiver of claim 1, wherein the second group includes Multi-Carrier Global System for Mobile Communication signals.

4. The receiver of claim 1, wherein the digital section includes a harmonic suppression device in one of the two paths of the digital section, which is used for the second group of wireless signals but is bypassed for the first group of wireless signals.

5. The receiver of claim 1, further comprising:
a first test signal input to receive a first test signal to calibrate the gain offset generator; and
a second test signal input to receive a second test signal to calibrate the phase corrector.

6. The receiver of claim 5, wherein the first test signal input is after the quadrature mixer and the second test signal input is before the quadrature mixer.

7. The receiver of claim 5, further comprising a digital quadrature corrector to detect non-linear imbalance errors between the third order harmonic distortions in response to the first and second test signal inputs.

8. The receiver of claim 7, wherein the digital quadrature corrector is also configured to set at least one coefficient to correct linear balance errors based on the first test signal.

9. A method of calibrating a receiver, comprising:
in a first calibration process:
receiving a first test signal;
propagating the first test signal through quadrature paths of the receiver;
detecting imbalance of harmonic distortions of the first test signal in the quadrature paths; and
based on the detected imbalance, adjusting gain offset of an analog downconverted signal in one of the quadrature paths; and
in a second calibration process:
receiving a second test signal, wherein the second test signal is a radio frequency signal;
downconverting the second test signal using quadrature local oscillation signals;
propagating the second test signal through the quadrature paths of the receiver;
detecting imbalance of harmonic distortions of the second test signal in the quadrature paths; and
based on the detected imbalance, adjusting a phase of one of the quadrature local oscillation signals.

10. The method of claim 9, further comprising:
in a third calibration process:
receiving the first test signal;
propagating the first test signal through the quadrature paths of the receiver;
detecting imbalance of harmonic distortions of the first test signal in the quadrature paths; and
based on the detected imbalance, adjusting coefficients for a digital quadrature corrector in one of the quadrature paths.

11. The method of claim 10, wherein the third calibration process is performed after the first calibration process, and the second calibration process is performed after the third calibration process.

12. The method of claim 10, wherein each calibration process is performed iteratively until the detected imbalance is within a respective threshold value.

13. The method of claim 9, wherein the receiver is configured to operate in two modes, a direct conversion mode and a low intermediate frequency (IF) mode.

14. The method of claim 13, wherein:
direct conversion mode is for a first group of signals and the first group includes Long Term Evolution (LTE) and/or Wideband Code Division Multiple Access (WCDMA) signals, and
low IF conversion mode is for a second group of signals and the second group includes MC-GSM signals.

15. The method of claim 13, further comprises using a harmonic suppression device in low IF conversion mode and bypassing the harmonic suppression device in direct conversion mode.

16. A receiver for balancing mismatch in baseband harmonics for effective suppression of the baseband harmonics, comprising:
an I-signal path and a Q-signal path receiving one or more test signals, wherein the Q-signal path is substantially 90 degrees out pf phase with the I-signal path;
means for measuring non-linear imbalance of harmonic distortions between the I-signal path and the Q-signal path;
a local oscillator phase corrector having a controllable phase;
a controller for adjusting gain offset in the Q-signal path in an analog domain based on the measured non-linear imbalance; and
digital section for cancelling a third order harmonic distortion of the signals of the I-signal path and the Q-signal path.

17. The receiver of claim 16, further comprising:
means for measuring linear imbalance of the harmonic distortions between signals; and
wherein the controller adjusts coefficients of a digital quadrature corrector in the Q-signal path based on the measured linear imbalance.

18. The receiver of claim 16, wherein:
the controller adjusts the controllable phase of the local oscillator phase corrector based on the non-linear imbalance until the measured non-linear imbalance is within a threshold.

19. The receiver of claim 16, wherein:
the controller adjusts the gain offset until the measured non-linear imbalance is within a threshold.

20. The receiver of claim 17, wherein:
the controller adjusts the coefficients of the digital quadrature corrector until the measured non-linear imbalance is within a threshold.

* * * * *